US010764166B2

(12) United States Patent
Allmendinger et al.

(10) Patent No.: US 10,764,166 B2
(45) Date of Patent: Sep. 1, 2020

(54) INJECTING LOST PACKETS AND PROTOCOL ERRORS IN A SIMULATION ENVIRONMENT

(71) Applicant: International Business Machines Corporation, Armonk, NY (US)

(72) Inventors: Dirk Allmendinger, Boeblingen (DE); Carsten Greiner, Boeblingen (DE); Roopesh Ambalath Matayambath, Bangalore (IN); Juergen Ruf, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/106,787

(22) Filed: Aug. 21, 2018

(65) Prior Publication Data
US 2018/0359168 A1 Dec. 13, 2018

Related U.S. Application Data

(63) Continuation of application No. 14/535,410, filed on Nov. 7, 2014, now Pat. No. 10,091,080.

(30) Foreign Application Priority Data

Nov. 13, 2013 (GB) .................................. 1319987.2

(51) Int. Cl.
*H04L 1/24* (2006.01)
*H04L 12/26* (2006.01)
(Continued)

(52) U.S. Cl.
CPC ........ *H04L 43/0847* (2013.01); *H04L 1/0045* (2013.01); *H04L 1/16* (2013.01);
(Continued)

(58) Field of Classification Search
None
See application file for complete search history.

(56) References Cited

U.S. PATENT DOCUMENTS 8,385,366 B2  3/2013  Sperschneider et al.
8,411,560 B2  4/2013  Samuels et al.
(Continued)

OTHER PUBLICATIONS

List of IBM Patents or Patent Applications Treated as Related, Sep. 28, 2018, 2 pages.
(Continued)

*Primary Examiner* — Noel R Beharry
*Assistant Examiner* — Pamit Kaur
(74) *Attorney, Agent, or Firm* — Heslin Rothenberg Farley & Mesiti P.C.; Steven Chiu, Esq.

(57) ABSTRACT

Testing a packet sequence number checker. The packet sequence number checker may check a packet-based data communication between two interconnected devices. An error injector may be provided in-between the interconnected devices such that the data packets may be received from one of the two interconnected devices and may be sent to the other one of the two interconnected devices by the error injector. A received packet is randomly selected from a packet data stream between the two interconnected devices and stored in a buffer. A length of a later received data packet from the same sender of the two interconnected devices is compared with the selected buffered data packet, and the later received data packet is replaced by the selected buffered data packet.

20 Claims, 7 Drawing Sheets

(51) Int. Cl.
*H04L 12/939* (2013.01)
*H04L 1/00* (2006.01)
*H04L 1/16* (2006.01)

(52) U.S. Cl.
CPC .............. *H04L 1/1607* (2013.01); *H04L 1/24* (2013.01); *H04L 43/50* (2013.01); *H04L 49/552* (2013.01); *H04L 2001/0097* (2013.01)

(56) References Cited

U.S. PATENT DOCUMENTS

| | | |
|---|---|---|
| 10,091,080 B2 * | 10/2018 | Allmendinger ..... H04L 43/0847 |
| 2003/0093485 A1 | 5/2003 | Dougall et al. |
| 2003/0149715 A1 | 8/2003 | Ruutu et al. |
| 2004/0218608 A1 | 11/2004 | Patiejunas |
| 2006/0104255 A1 | 5/2006 | Kido et al. |
| 2007/0206621 A1 | 9/2007 | Plamondon et al. |
| 2008/0020746 A1 * | 1/2008 | Alexandar ............ H04W 24/06 455/423 |
| 2010/0284281 A1 | 11/2010 | Sperschneider |
| 2011/0170542 A1 * | 7/2011 | Liu ........................ H04L 12/18 370/390 |
| 2011/0282642 A1 | 11/2011 | Kruger et al. |
| 2013/0148503 A1 | 6/2013 | Hutchinson et al. |
| 2013/0286887 A1 * | 10/2013 | Lu ........................... H04L 43/10 370/253 |
| 2015/0131456 A1 | 5/2015 | Allmendinger et al. |

OTHER PUBLICATIONS

Search Report under Section 17(5) for GB1319887.2 dated May 1, 2014, 3 pages.

* cited by examiner

INJECTING LOST PACKETS AND PROTOCOL ERRORS IN A SIMULATION ENVIRONMENT

PRIOR FOREIGN APPLICATION

This application claims priority from United Kingdom patent application number 1319987.2, filed Nov. 13, 2013, which is hereby incorporated herein by reference in its entirety.

BACKGROUND

One or more aspects of the invention relate generally to testing a packet sequence number checker. Further, one or more aspects of the invention relate to an error injector for testing a packet sequence number checker, a method, a computing system, a data processing program, and a computer program product.

New electronic systems, in particular digital chips like a System-on-a-Chip (SoC), or a communication between two chips or systems, are typically designed by using software tools. These allow designing, simulating and testing the functionality before the chips are built as a semiconductor device. Typically, a hardware description language or hardware design language (HDL) is used. Producing the actual chips is very expensive. Therefore, intensive testing of the design is required. Typically, simulation-based verification is used for this purpose and a verification of error scenarios is essential to quantify the correctness of the hardware design. One of the important error scenarios are data packet sequence number failures between communicating devices, i.e., packets may come out of order or packets may be lost and sequence numbers may be missing.

In, e.g., communication protocols based on the Peripheral Component Interconnect Express (PCIE) or other I/O protocols, a cyclic redundancy code (CRC) check is performed before a packet sequence number is evaluated as part of the communication protocol. A communication simulation in which a CRC check has to be performed as part of the simulation for every simulated data packet exchange is very compute intensive. Additionally, current communication simulation solutions require some knowledge about the underlying communication protocol.

A couple of published documents address the topic of communicating devices. U.S. Pat. No. 8,411,560 B2, incorporated by reference herein in its entirety, discloses a method for detection and the transmission of lost packets for a reliable communication over a network.

U.S. Pat. No. 8,385,366 B2, incorporated by reference herein in its entirety, discloses in the context of packet-oriented data transmission via a network an apparatus for transmitting a sequence of data packets that checks whether a packet is missing or faulty. In this case, a replacement packet is provided which is a valid packet with regard to a packet syntax.

BRIEF SUMMARY

However, there is a need for a low overhead simulation of a communication between two devices, in particular, simulating lost data packets in an elegant way.

This need may be addressed by a method for testing a packet sequence number checker, error injector for testing a packet sequence number checker, a computing system, a data processing program, and a computer program product, according to one or more aspects.

According to one aspect, a method for testing a packet sequence number checker may be provided. The packet sequence number checker may be adapted to check a packet-based data communication between two interconnected devices for a correctness of transmission. The method may comprise providing an error injector in-between the interconnected devices such that the data packets may be received from one of the two interconnected devices and may be sent to the other one of the two interconnected devices by the error injector. The method may further comprise randomly selecting received data packets from a packet data stream between the two interconnected devices, storing said selected data packet in a buffer, comparing the length of a later received data packet from the same sender of the two interconnected devices with said selected buffered data packet, and replacing the later received data packet by said selected buffered data packet.

In other embodiments, an error injector for testing a packet sequence number, a computer system and a computer program product may be provided.

BRIEF DESCRIPTION OF THE SEVERAL VIEWS OF THE DRAWINGS

Embodiments of the invention will now be described, by way of example only, and with reference to the following drawings.

DETAILED DESCRIPTION

Figure 1:
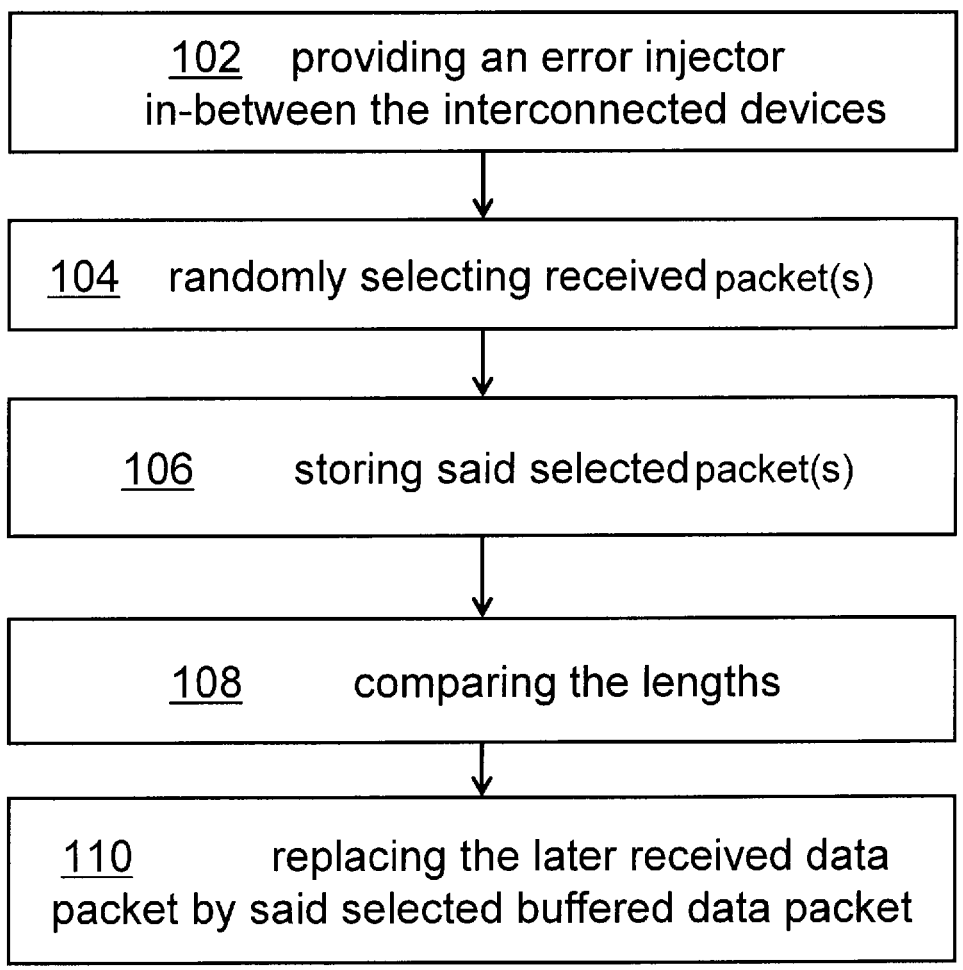
FIG. 1 shows a block diagram of an embodiment of the method, in accordance with one or more aspects.

In the context of this description, the following conventions, terms and/or expressions may be used:

The term "packet sequence number checker" may denote a function which may be realized in hardware or software. It may be one of the first circuits a received data packet transmitted over a communication line may have entered. The packet sequence number checker may check the packet sequence number of the received data packet and may acknowledge a continuously ascending numbering of the packet sequence numbers. In case the packet sequence number does not comprise a continuously ascending order, a NAK (no acknowledgement) data packet or signal may be generated. However, before the incoming signal may enter the packet sequence number checker, a CRC check may have been performed. The data packets or just packets may have a variable or a fixed length.

The term "interconnected devices" may denote any two devices that are connected via one or more communication line(s). The devices may be periphery components, processors, memory systems or any other component or any combination of the just mentioned elements that may communicate via a serial protocol.

The term "error injector" may denote a component adapted to inject data packets into a serial communication protocol on a communication line between two devices.

The term "data packet" or simply packet may be a formatted unit of data carried by a packet-switched network. Computer communications links that do not support packets, such as traditional point-to-point telecommunications links, simply transmit data as a bit stream. When data is formatted into packets, the bandwidth of the communication medium can be better shared among users than if the network were circuit switched.—A packet may consist of two kinds of data: control information and user data (also known as payload). The control information may provide data the network needs to deliver the user data, for example: source and destination network addresses, error detection codes, and sequencing information in particular packet sequence numbers. Typically, control information may be found in packet headers and trailers, with payload data in between.

In one or more embodiments of the method for testing a packet sequence number checker, there is no need to know the mechanism used for generating the CRC of the communication protocol. Therefore, no recalculation of the CRC in case of injecting data packets is required. This may reduce the computational requirements of the hardware design simulation system. The method is easy to implement and can be used very efficiently for lost packet error injection in all simulation environments in which two devices are connected back to back. One of the problems of existing solutions is the fact that the CRC check is done before a PSN (packet sequence number) check may be performed. Hence, a simple change of a PSN without changing and thus recalculating the CRC would not generate the desired effect to test the packet sequence number checker.

The method may also be implemented completely in hardware.

Moreover, the method may be used for any protocols where the data packets flow based on packet sequence numbers and CRC checks. Thus, it may be said that the method is protocol-independent. The method may also be used to simulate processor interconnections. Hence, the design quality of central processing units interconnected with each other may be enhanced.

In a further embodiment, the method may also be used for an injection of wrong packet sequence numbers in acknowledgment packets.

In addition, protocols that are based on PCIE, using only the physical layer (PHY) component of the protocol, may be simulated. Some of these reduced protocols may not be adherent to the complete PCIE protocol because they may not use the standard data link layer and transaction layer of the protocol. Commercially available simulation environments may require that the complete PCIE stack has to be tested. The currently proposed method may not require a complete PCIE stack.

In PCIE, transaction layer packets (TLP) flow based on packet sequence numbers in such a way that the packet sequence number gets incremented for every TLP packet. If the device identifies a lost packet or incorrect CRC, it has to send back a NAK data packet to the device which has sent the original data packet. However, before checking the packet sequence number, every device checks for the CRC error on the packet. So, creating a lost data packet scenario is tricky because if one may corrupt the packet sequence number to mimic the lost data packet scenario, the design would detect the mismatch of the CRC. So, in this case a correct CRC check has to be recalculated based on the new packet sequence number and that has to be put back into the data packet. For calculating the correct CRC, the CRC algorithm may need a changed payload and a changed CRC. The algorithm may be different based on the applications which may also have different data link layer packets (DLLP). The same situation applies for injecting wrong packet sequence numbers in acknowledgment messages (ACK) wherein an ACK DLLP has a lower packet sequence number than the previous ACK.

In the following section, additional embodiments may be described.

In one embodiment, the method may be performed as part of a hardware simulation method performed in a hardware simulator. The hardware simulator may simulate hardware components and/or systems which may be described in a hardware definition language (HDL). Thus, a communication between interconnected devices may be tested before the hardware may be produced in actual semiconductor devices.

According to one embodiment, the randomly selecting may be based on an output of a random number generator. This way, a statistical distribution of selected packets may be achieved. Systematic errors in the testing method may be avoided.

According to a further embodiment, the number of selected data packets per time unit may be configurable. With this feature, better influence of the distribution of selected packets is possible. In the simulator also other functions may be tested in parallel. The testing of the packet sequence number checker may be over-weighted in comparison to other tests or it may be lowered in importance if compared to other tests performed.

According to a further enhanced embodiment, a distribution in time of the number of selected data packets may be configurable. Also this may allow more flexibility in the kind of tests performed. A real stress test may be defined this way. In certain time periods a massive amount of errors may be generated by bringing the packet sequence number again and again in disorder, also hidden errors in the packet sequence number checker of a simulated hardware may be detected.

According to an additional embodiment, the data packet may be an acknowledgment data packet that may be sent back to the sender of the data packets, wherein the sender may be one of the two interconnected devices. Thus, not only the communication based on the active data packets from a sender to the receiver may be tested, but also parts of the confirmation protocol, e.g., acknowledgement messages which may underlay the same packet sequence number scheme and CRC check as the actively forwarded data packets.

Embodiments of the method may be directed to specific communication protocols. In particular, the data packets may be part of the Peripheral Component Interconnect Express communication protocol or of the InfiniBand communication protocol.

Also the length of the data packets may—in one embodiment—be extracted from a header of the data packet. Typically, the header of the data packet may comprise the length information in case of data packets with variable length. Thus, a comparison of the length of different data packets, in particular those that may be received at different points in time by the error injector may be performed. Only data packets comprising the same length may be exchanged against each other without causing a CRC check error.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, e.g., between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of a method for testing a packet sequence number checker is given. Afterwards, further embodiments of the error injector for testing a packet sequence number checker will be described.

Figure 2:
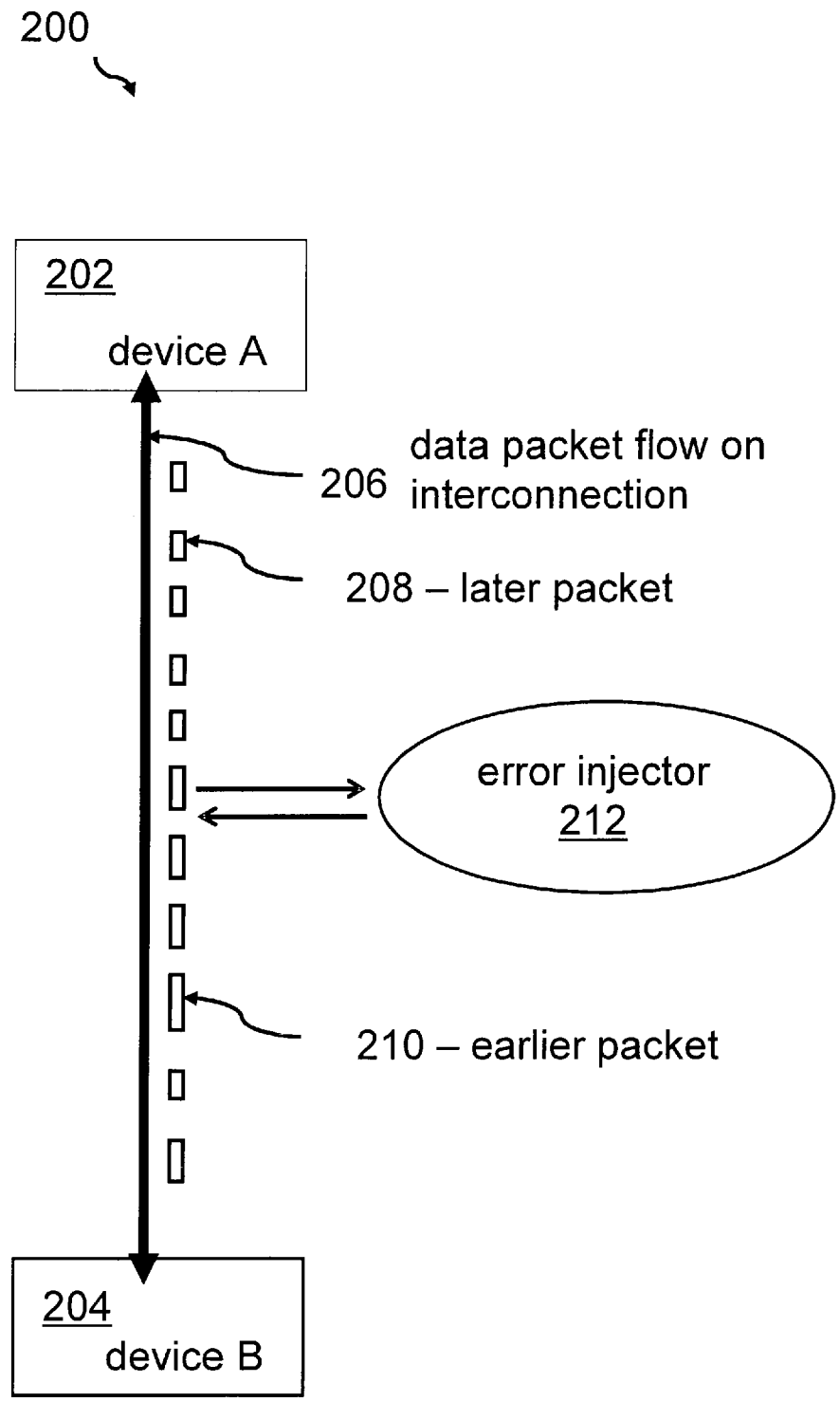
FIG. 2 shows a block diagram of two communicating devices via an interconnection together with an error injector.

FIG. 1 shows a block diagram of an embodiment of the method 100 for testing a packet sequence number checker 508 (FIG. 5) for a packet-based data communication between two interconnected devices 202, 204 (FIG. 2). The method 100 may comprise providing, 102, an error injector 212 (FIG. 2) in-between the two interconnected devices 202, 204 such that the data packets may be received from one of the two interconnected devices 202, 204 and may be sent to one of the two interconnected devices 202, 204 by the error injector 212. The sending of the data packets may be performed in both directions. Thus, no sending direction may be preferred. Additionally, also a check of correctly received acknowledgement data packets (ACK) may be performed. FIG. 1 shows additionally a randomly selecting 104 of received packets from a packet data stream between the two interconnected devices. The data selected packets may be stored, 106, in a buffer 310 (FIG. 3), and the length of a later received data packet 208 (FIG. 2) from the same sender 202 of the two interconnected devices 202, 204 may be compared, 108, with a selected buffered data packet. Then, the later received data packet 208 may be replaced, 110, by said selected buffered data packet. This may have the consequence that normally continuously ascending packet sequence numbers from packet to packet do not continuously ascend signaling an error in the communication protocol.

FIG. 2 shows a block diagram 200 of two communicating devices 202, 204 via an interconnection 206 together with an error injector 212. A device A 202 may be in communication with device B 204 via a communication line. The communication line may be symbolized by the vertical arrows 206 between device A 202 and device B 204. Data packets are flowing on the interconnection between device A 202 and device B 204, compared reference numeral 206. If a communication from device A 202 to device B 204 is performed, an abstract timeline would go from the top of FIG. 2 to the bottom of FIG. 2. Thus, a later sent packet 208 is closer to device A 202 and an earlier sent packet 210 is close to device B 204. In-between device A 202 and device B 204, an error injector 212 is shown. This error injector 212 may influence the communication on the interconnection as shown by the two horizontal arrows. The interconnection may be understood as a logical communication line. The wired communication line may connect device A 202 and the error injector 212 as well as the error injector 212 and device B 204. Thus, the error injector would sit between the two devices 202 and 204 in the simulation environment. It may also be mentioned that it may be irrelevant how many packets may pass the error injector 212 without any error injection.

Figure 3:
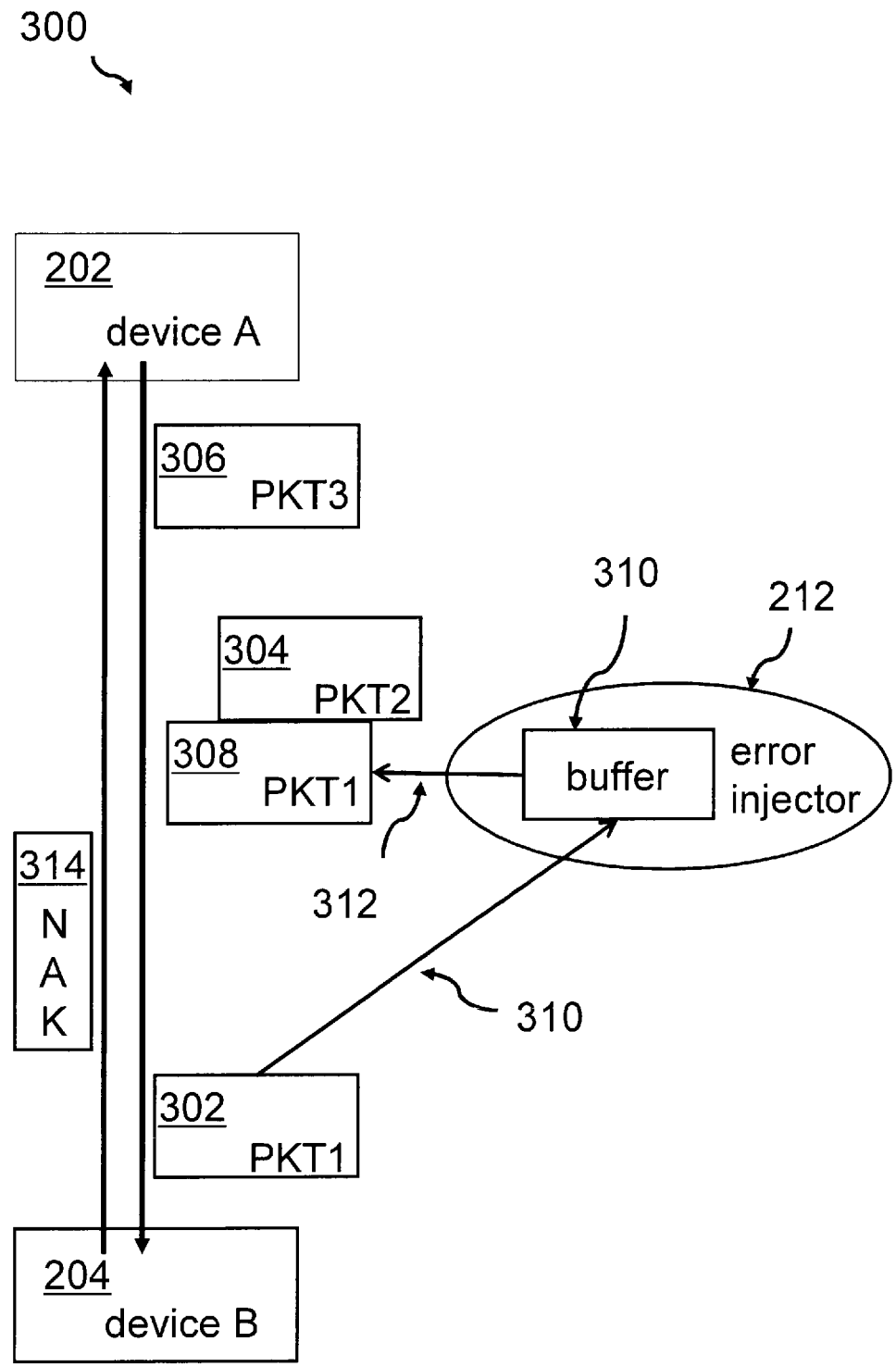
FIG. 3 shows a block diagram of the same communication devices together with the error injector in action.

FIG. 3 shows a block diagram 300 of the same communication devices 202, 204 together with the error injector 212 in action. Device A 202 may send a series of data packets PKT1 302, PKT2 304, PKT3 306 over the interconnection. The packets may have a continuously ascending packet sequence number (PSN). However, the data packets PKT1 302, PKT2 304, PKT3 306 may not go directly from device A 202 to device B 204, but may be routed via the error injector 212. As shown, the error injector 212 may buffer, 310, PKT1 302 in its buffer 310. In a next step, the error injector 212 may suppress forwarding PKT2 304 and send instead PKT1 302—compared reference numeral 312. Thus, the content of PKT2 304 may be overwritten by the content of PKT1 302. Instead of receiving a data packet with the packet sequence number of data packet PKT2, a 2nd data packet PKT1 308 with the same sequence number as the first data packet PKT1 302 may be received by device B 204. This may cause an error within the packet sequence number checker of device B 204. A NCK message 314 may be generated and sent back to device A 202. With this, the functionality of the packet sequence number checker 508 in device B 204 may be checked. However, this may only work without recalculating the CRC if the data packet length of PKT1 and PKT2 are the same.

Figure 4:
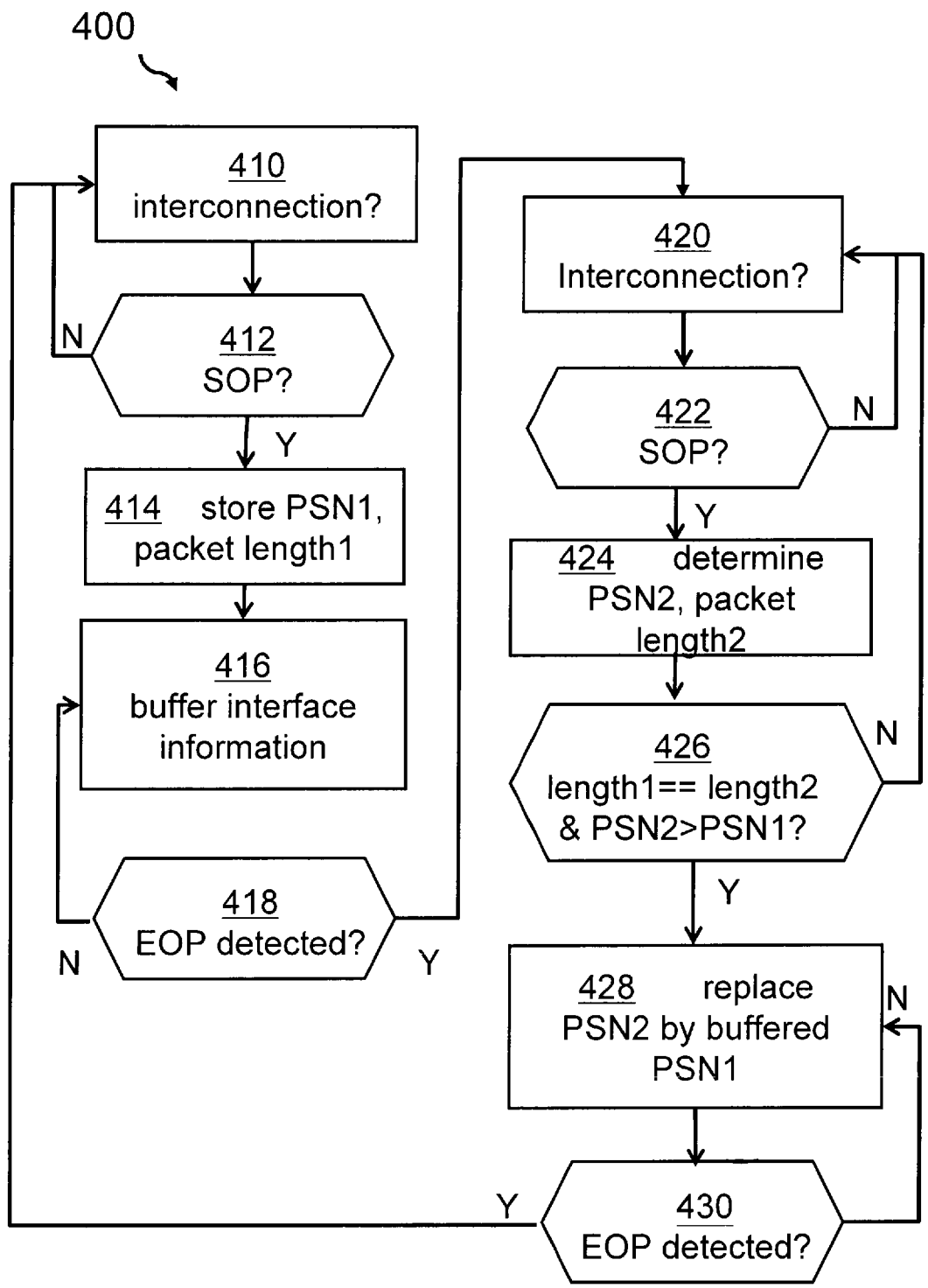
FIG. 4 shows a more detailed flowchart of an embodiment of the method, in accordance with one or more aspects.

FIG. 4 shows a more detailed flowchart 400 of the method 100. Firstly, it is sensed whether an interconnection between device A 202 and device B 204 does exist, 410. In the next step, 412, a stuff of packet is detected. Additionally, it may be determined whether a random value of a random number generator may be zero. In case of "no", the flow returns to box 410. In case of "yes", PSN1 may be determined and stored, 414, together with length1 of data packet PSN1. Additionally, the current interface information may be buffered, 416. This buffering may continue until content of a data packet may be detected, 418.

If an end of data packet may have been detected, the related system may sense again the interconnection, 420. The system may try to detect a new "start of packet", 422. Then, PSN2 together with length2 of packet 2 may be determined, 424. If the length of the data packets with PSN1 and PSN2 may be equal, 426, the packet carrying PSN2 may be replaced with the buffered data packet comprising PSN1, 428. Also the interface information may be replaced. If an end of data packet may be detected at 430 the process flow may continue with sensing, 410, the interconnection.

Figure 5:
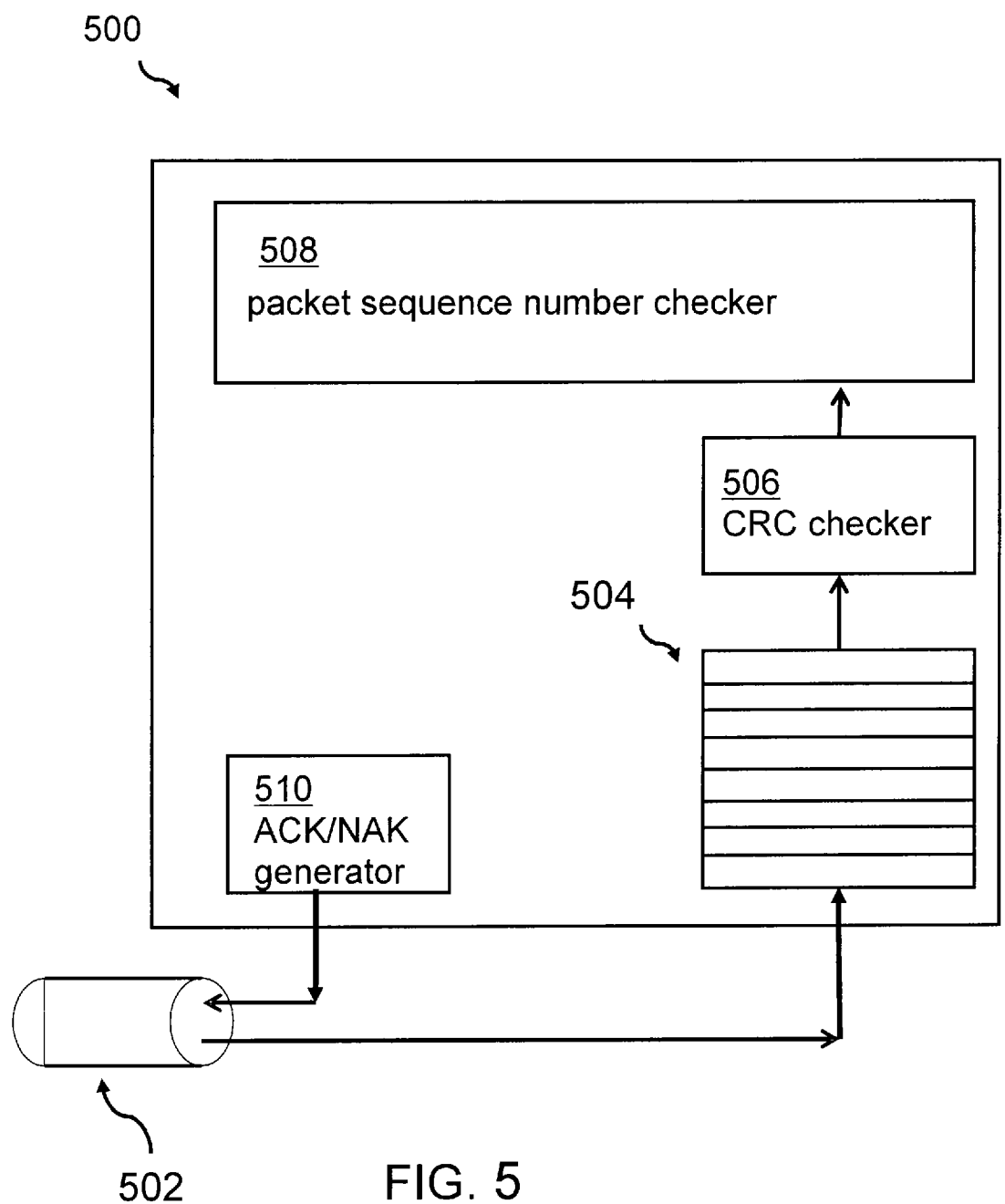
FIG. 5 shows a block diagram of an entry circuit for a data communication via an interconnection.

FIG. 5 shows a block diagram 500 of an entry circuit for a data communication via an interconnection which may be symbolized by 502. An incoming data packet may be buffered in a receive buffer 504. Next, a CRC check may be performed by the CRC checker 506. After the CRC check has been performed the data packet may be forwarded to a packet sequence number checker 508. If it is detected that the PSN is received in a continuously ascending order, an ACK packet may be generated by the generator 510 and it may be sent back to the originator of the received data packet, in this case device 502. In case an error may be detected in the PSN sequence, a NCK may be generated and returned to the sender.

This figure shows clearly the typical checks within an entry circuit of a communication link. Firstly, a CRC check may be performed and after that the PSN may be determined and checked for a correct order. Therefore, only replacing the PSN within an existing packet may generate an error by the CRC checker. However, the here disclosed method allows an incoming packet to pass through the CRC checker 506, because the incoming data packet has also—in case of an injected packet—a correct CRC and can be forwarded to the packet sequence number checker which is under test.

Figure 6:
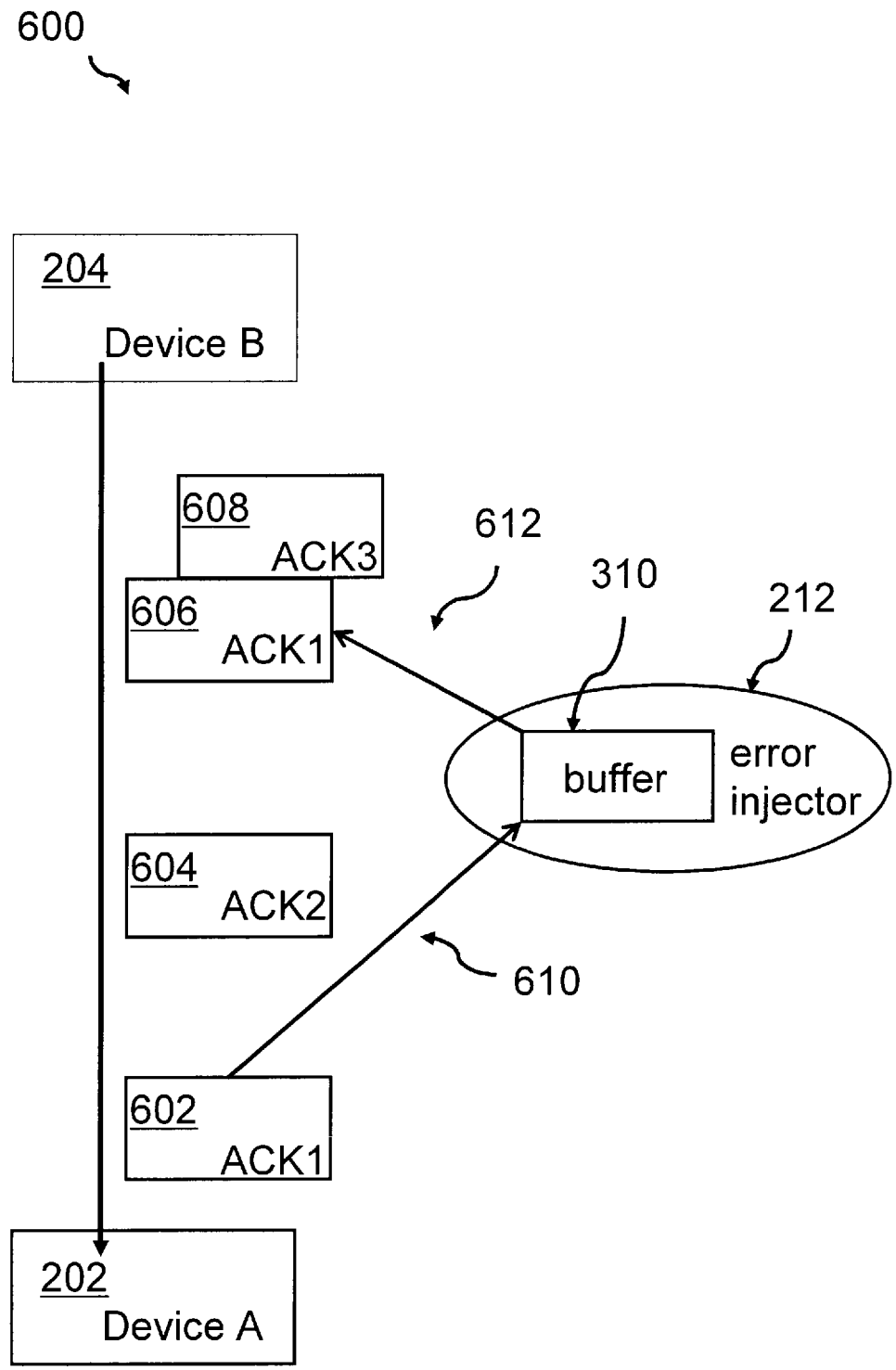
FIG. 6 shows a block diagram of one or more aspects of the method applied to a sequence of acknowledgment packets.

FIG. 6 shows a block diagram 600 of one embodiment of method 100, applied to a sequence of acknowledgment packets. Here, a series of acknowledgement packets ACK1 602, ACK2 604, ACK3 608 may be transmitted over the interconnection from device B 204 to device A 202. In this case, ACK1 602 may be buffered, 610, in the buffer 310 of error injector 212. This ACK1 may then replace ACK3 608 as shown by an arrow 612 and reference numeral 606. Again, a correct ordering of related PSNs may not be given and an error in the communication between the two devices 202, 204 may be detected. Also here, an exchange of ACK packets without a requirement to modify the CRC allows an easy simulation and test for the packet sequence number checker in a simulated environment.

Figure 7:
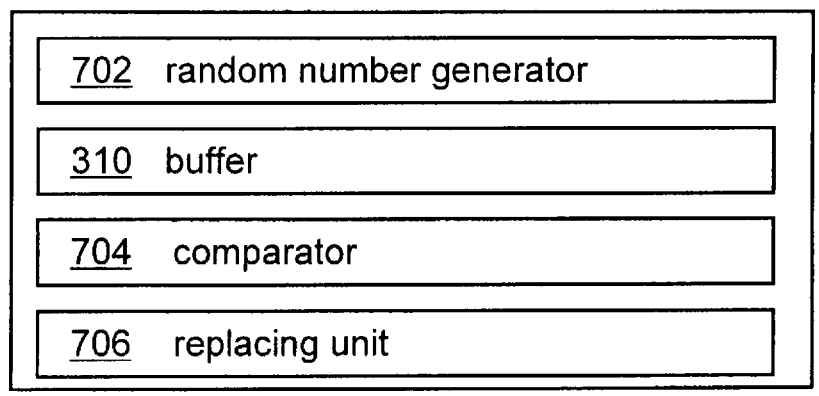
FIG. 7 shows a block diagram of an error injector, in accordance with one or more aspects.

FIG. 7 shows a block diagram of one embodiment of an error injector 212. The error injector 212 may comprise a random number generator 702 for randomly selecting received packets from a packet data stream between the two interconnected devices 202, 204, a buffer 310 adapted to store a selected packet, a comparator 704 adapted to compare the length of a later received data packet from the same sender of the two interconnected devices with the length of the selected buffered data packet. Additionally, the error injector 212 may comprise a replacing unit 706 adapted to replace the later received data packet 208 by the selected buffered data packet.

Figure 8:
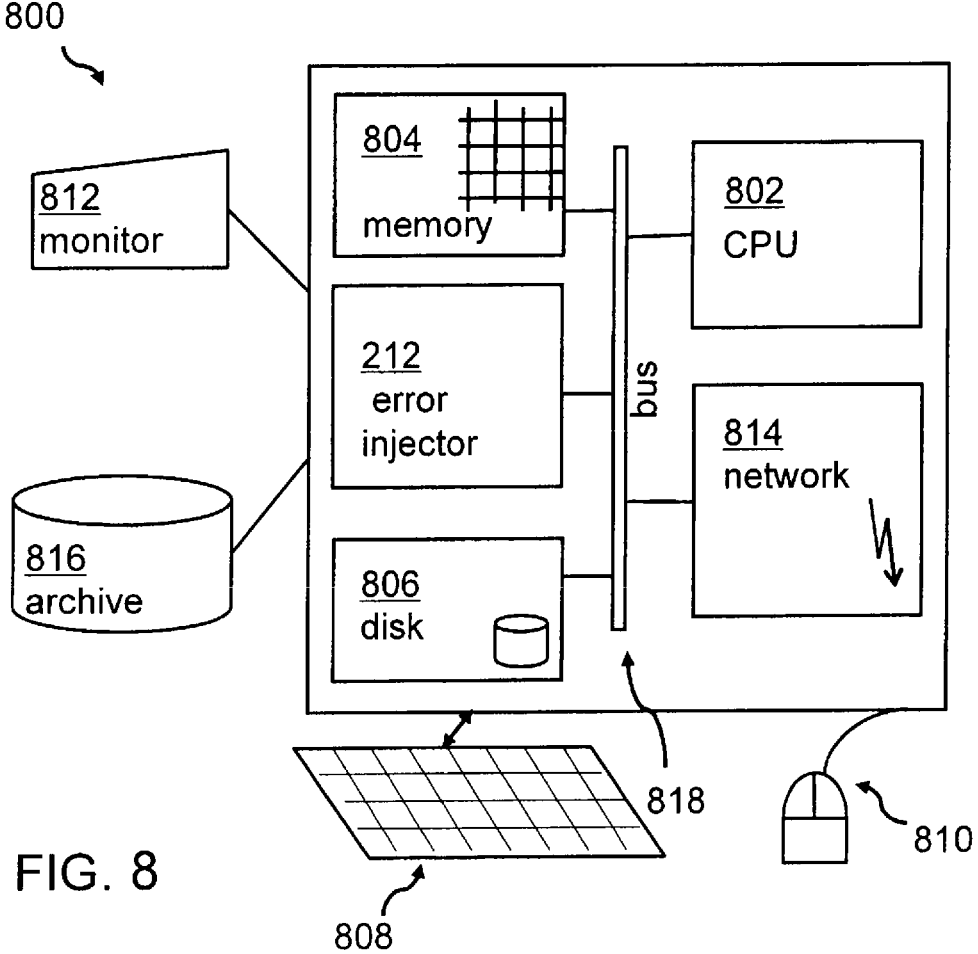
FIG. 8 shows a block diagram of a computer comprising the error injector.

Embodiments of the invention may be implemented together with virtually any type of computer, regardless of the platform being suitable for storing and/or executing program code. For example, as shown in FIG. 8, a computing system 800 may include one or more processor(s) 802 with one or more cores per processor, associated memory elements 804, an internal storage device 806 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 816 for an execution. Elements inside the computer 800 may be linked together by means of a bus system 818 with corresponding adapters. Additionally, the error injector 212 for testing a packet sequence number checker may also be attached to the bus system 818.

The computing system 800 may also include input means, such as a keyboard 808, a pointing device such as a mouse 810, or a microphone (not shown). Alternatively, the computing system may be equipped with a touch sensitive screen as main input device. Furthermore, the computer 800, may include output means, such as a monitor or screen 812 [e.g., a liquid crystal display (LCD), a plasma display, a light emitting diode display (LED), or cathode ray tube (CRT) monitor]. The computer system 800 may be connected to a network (e.g., a local area network (LAN), a wide area network (WAN), such as the Internet or any other similar type of network, including wireless networks via a network interface connection 814. This may allow a coupling to other computer systems or a storage network or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

As described herein, according to one aspect, a method for testing a packet sequence number checker may be provided. The packet sequence number checker may be adapted to check a packet-based data communication between two interconnected devices for a correctness of transmission. The method may comprise providing an error injector in-between the interconnected devices such that the data packets may be received from one of the two interconnected devices and may be sent to the other one of the two interconnected devices by the error injector. The method may further comprise randomly selecting received data packets from a packet data stream between the two interconnected devices, storing said selected data packet in a buffer, comparing the length of a later received data packet from the same sender of the two interconnected devices with said selected buffered data packet, and replacing the later received data packet by said selected buffered data packet.

According to another aspect, an error injector for testing a packet sequence number checker may be provided. The packet sequence number checker may test a packet-based data communication between two interconnected devices, wherein the error injector is connected in-between the two interconnected devices such that the data packets are received from one of the two interconnected devices and sent to the other of the two interconnected devices by the error injector. The error injector may further comprise a random number generator for randomly selecting received data packets from a packet data stream between the two interconnected devices, a buffer adapted for storing said selected data packet, a comparator adapted for comparing the length of a later received data packet from the same sender of the two interconnected devices with said selected buffered data packet, and a replacing unit adapted for replacing the later received data packet by said selected buffered data packet.

It may be noted that the replacement is made in such a way that packet sequence numbers are in disorder, in particular no longer in a continuously ascending order as they would be, according to typical communication protocol used between the two devices.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below, if any, are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method of testing a packet sequence number checker for a packet-based data communication between two interconnected devices, the method comprising:
    randomly selecting a received data packet with a first sequence number from a packet data stream on a logical communication line between the two interconnected devices, wherein data packets are received in an order from one of the two interconnected devices and sent in the order to the other one of the two interconnected devices on the logical communication line;
    storing the randomly selected received data packet in a buffer;
    comparing a length of a later received data packet with a second sequence number from the same sender of the two interconnected devices with the randomly selected received data packet stored in the buffer; and
    replacing the later received data packet in the order on the logical communication line between the two interconnected devices, with the randomly selected received data packet stored in the buffer, wherein the packet data stream is received from a first device of the two interconnected devices and sent to a second device of the two interconnected devices, wherein based on the replacing in the order, the second device receives the first sequence number in the order in place of the second sequence number via the logical communication line, generating an error within the packet sequence number checker.

2. The method according to claim 1, wherein the method is performed as part of a hardware simulation method performed in a hardware simulator.

3. The method according to claim 1, wherein the randomly selecting is based on an output of a random number generator.

4. The method according to claim 1, wherein a number of selected data packets per time unit is configurable.

5. The method according to claim 1, wherein a distribution in time of a number of selected data packets is configurable.

6. The method according to claim 1, wherein the data packet is an acknowledge data packet that is sent back to a sender of the data packets, wherein the sender is one of the two interconnected devices.

7. The method according to claim 1, wherein the data packets are part of a communication protocol, wherein the communication protocol is a Peripheral Component Interconnect Express protocol or an InfiniBand protocol.

8. The method according to claim 1, wherein a length of the data packet is extracted from a header of the data packet.

9. A system for testing a packet sequence number checker for a packet-based data communication between two interconnected devices, wherein data packets are received in an order from one of the two interconnected devices and sent in the order to the other one of the two interconnected devices on a logical communication line, the system comprising:
    a random number generator to randomly select a received data packet with a first sequence number from a packet data stream on the logical communication line between the two interconnected devices;
    a buffer to store the randomly selected data packet;
    a comparator adapted to compare a length of a later received data packet with a second sequence number from the same sender of the two interconnected devices with the randomly selected data packet stored in the buffer; and
    a replacing unit adapted to replace the later received data packet in the order on the logical communication line between the two interconnected devices by the randomly selected data packet stored in the buffer by injecting the randomly selected packet from the packet data stream back into the packet data stream on the logical communication line between the two interconnected devices such that the packet data stream is received from a first device of the two interconnected devices and sent to a second device of the two interconnected devices, wherein based on the replacing in the order, the second device receives the first sequence number in the order in place of the second sequence number via the logical communication line, generating an error within the packet sequence number checker.

10. The system of to claim 9, wherein the replacing signals an error in communication protocol, based on packet sequence numbers of packets in the packet data stream in the order.

11. The system of to claim 9, wherein a number of selected data packets per time unit is configurable.

12. The system of to claim 9, wherein a distribution in time of a number of selected data packets is configurable.

13. The system of to claim 9, wherein the data packet is an acknowledge data packet that is sent back to a sender of the data packets, wherein the sender is one of the two interconnected devices.

14. The system of to claim 9, wherein the data packets are part of a communication protocol, wherein the communication protocol is a Peripheral Component Interconnect Express protocol or an InfiniBand protocol.

15. A computer program product for testing a packet sequence number checker for a packet-based data communication between two interconnected devices, the computer program product comprising:
    a computer readable storage medium readable by a processing circuit and storing instructions for execution by the processing circuit for performing a method comprising:
        randomly selecting a received data packet with a first sequence number from a packet data stream on a logical communication line between the two interconnected devices, wherein data packets are received in an order from one of the two interconnected devices and sent in the order to the other one of the two interconnected devices on the logical communication line;

storing the randomly selected received data packet in a buffer;

comparing a length of a later received data packet with a second sequence number from the same sender of the two interconnected devices with the randomly selected received data packet stored in the buffer; and replacing the later received data packet in the order on the logical communication line between the two interconnected devices, with the randomly selected received data packet stored in the buffer, wherein the packet data stream is received from a first device of the two interconnected devices and sent to a second device of the two interconnected devices, wherein based on the replacing in the order, the second device receives the first sequence number in the order in place of the second sequence number via the logical communication line, generating an error within the packet sequence number checker.

16. The computer program product according to claim 15, wherein the randomly selecting is based on an output of a random number generator.

17. The computer program product according to claim 15, wherein a number of selected data packets per time unit is configurable.

18. The computer program product according to claim 15, wherein a distribution in time of a number of selected data packets is configurable.

19. The computer program product according to claim 15, wherein the data packet is an acknowledge data packet that is sent back to a sender of the data packets, wherein the sender is one of the two interconnected devices.

20. The computer program product according to claim 15, wherein the data packets are part of a communication protocol, wherein the communication protocol is a Peripheral Component Interconnect Express protocol or an InfiniBand protocol.

* * * * *